Jan. 25, 1938.　　　A. M. JOHNSON　　　2,106,217
MACHINE TOOL
Filed Nov. 29, 1935　　　5 Sheets-Sheet 1
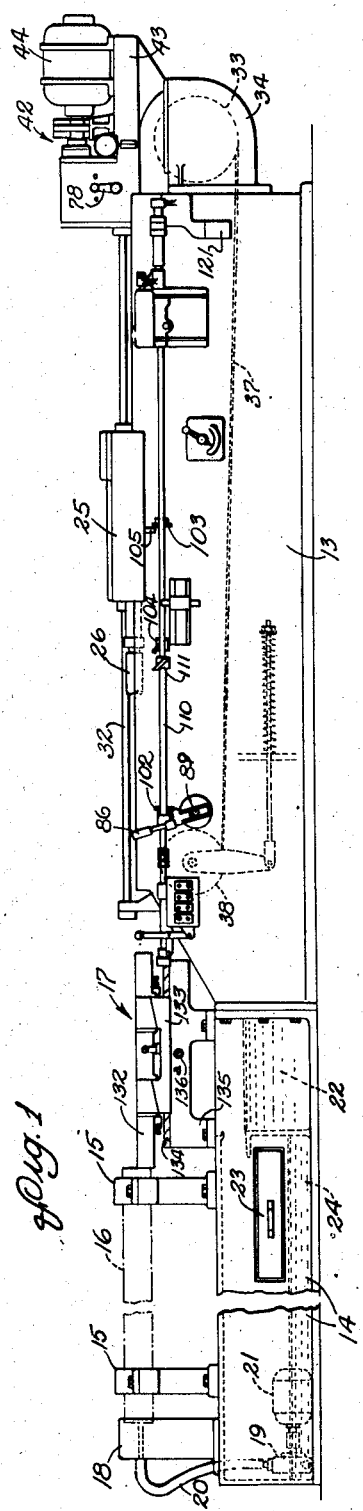
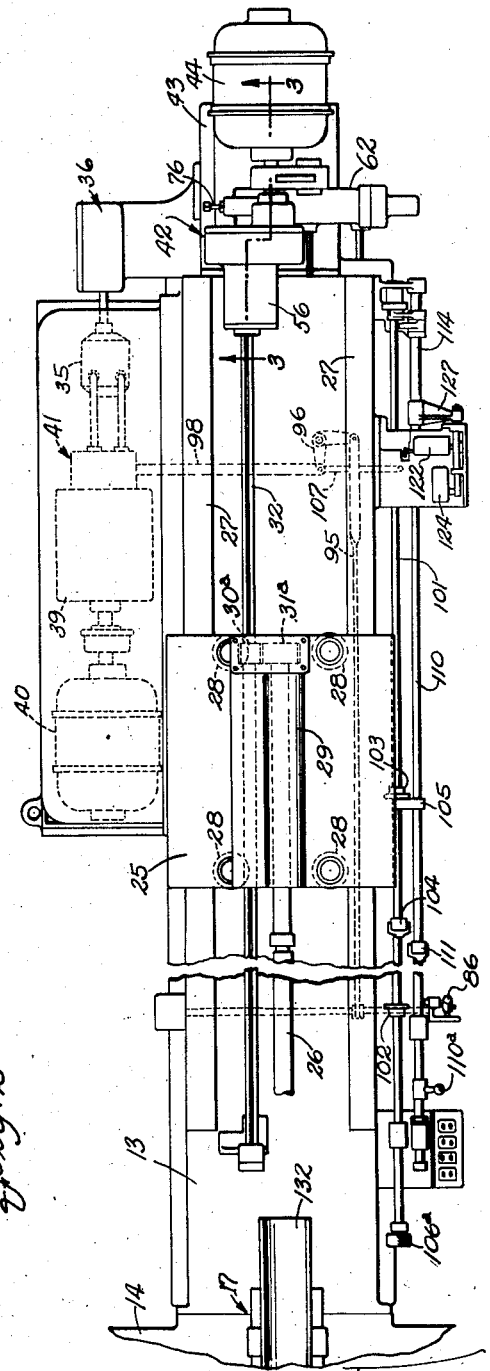
INVENTOR
Albert M. Johnson
By Parker, Carlson, Pitzner & Hubbard
ATTORNEYS Jan. 25, 1938.        A. M. JOHNSON        2,106,217
MACHINE TOOL
Filed Nov. 29, 1935        5 Sheets-Sheet 2
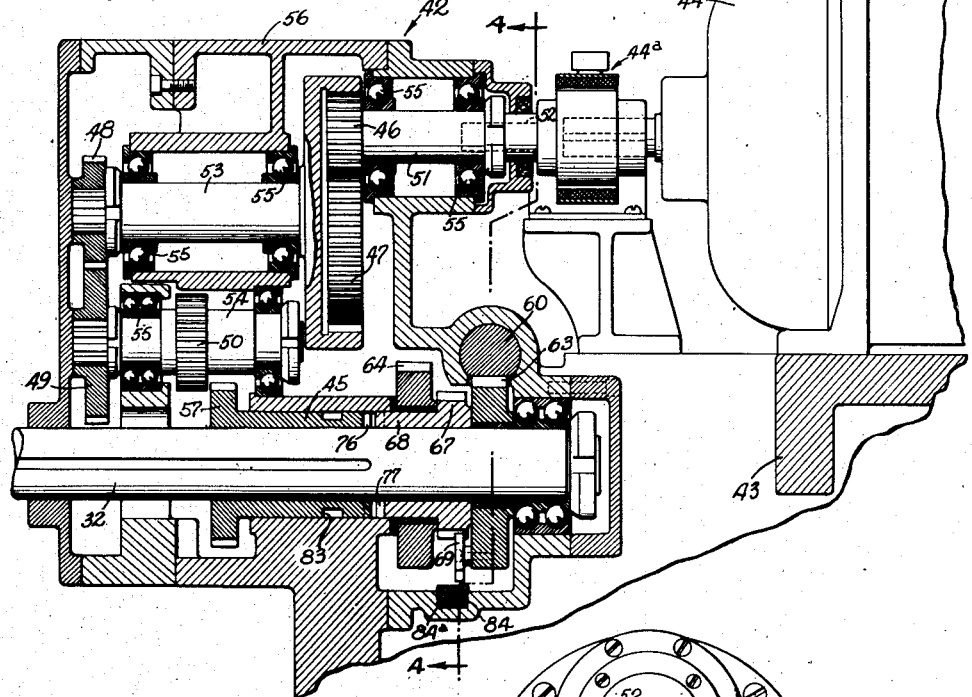
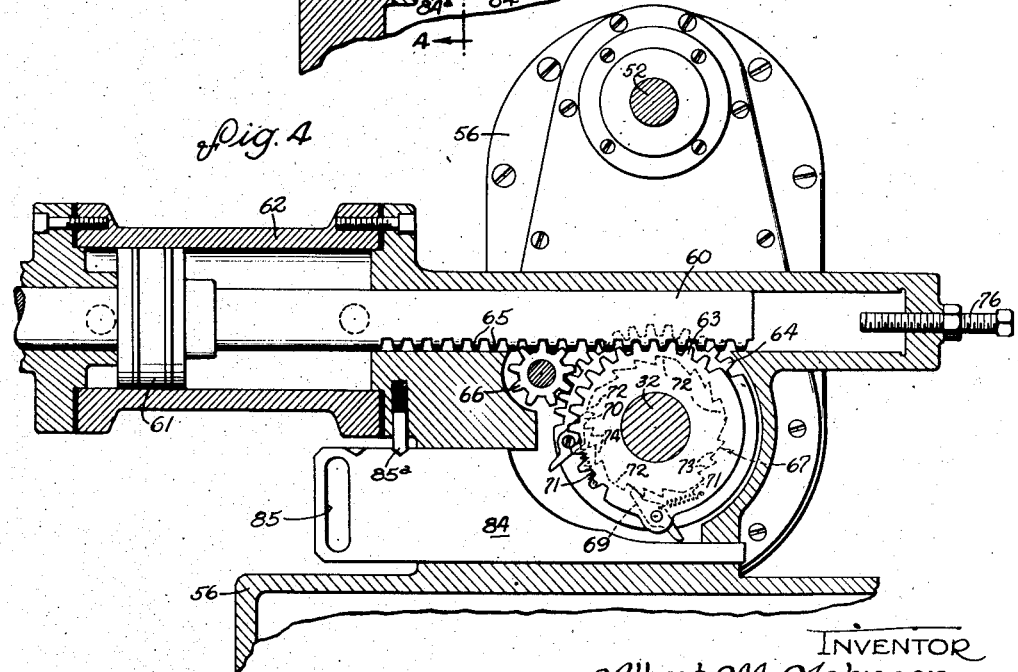
INVENTOR
Albert M. Johnson
By Parker, Carlson, Pitzner & Hubbard
ATTORNEYS

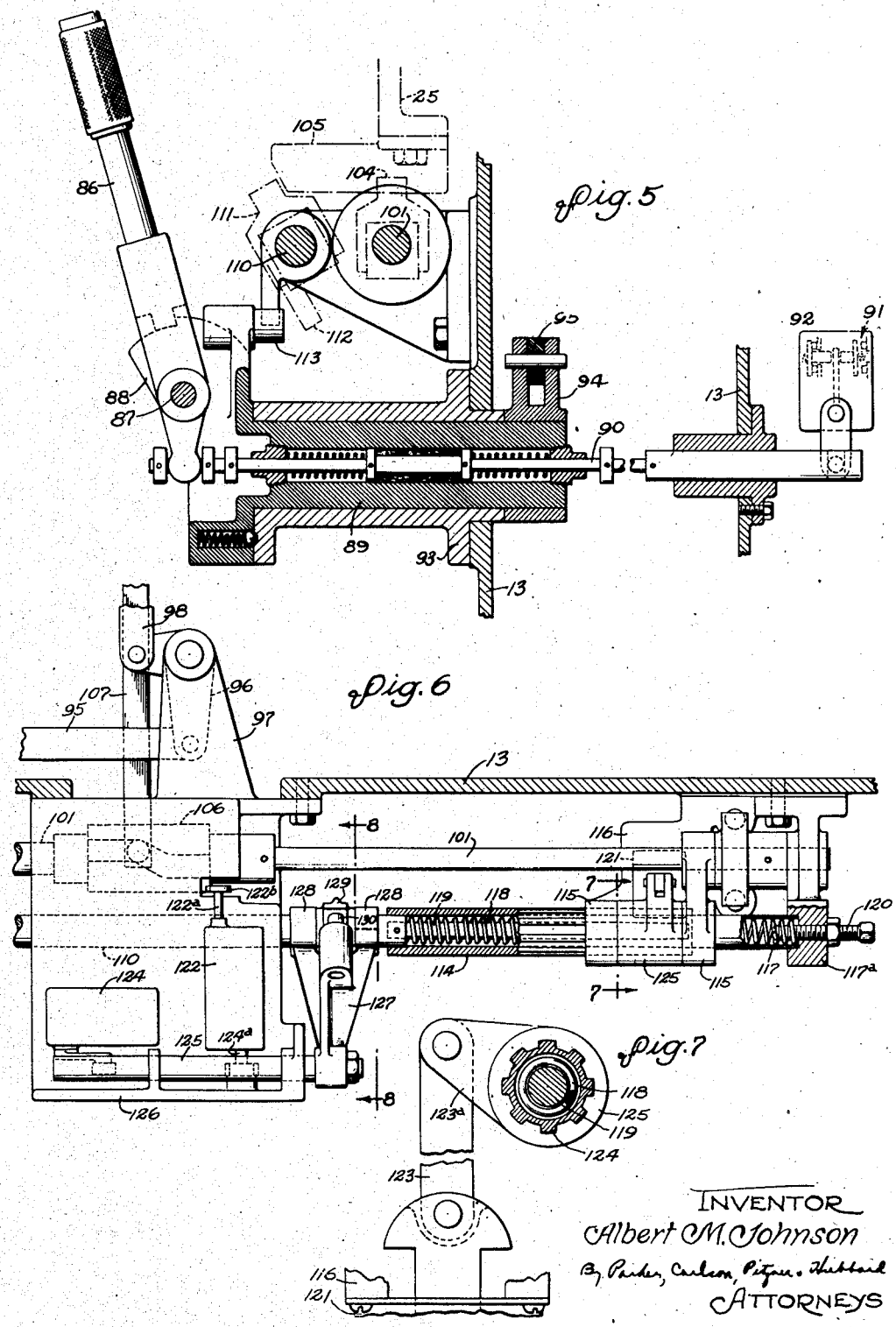

Jan. 25, 1938.   A. M. JOHNSON   2,106,217
MACHINE TOOL
Filed Nov. 29, 1935   5 Sheets-Sheet 4
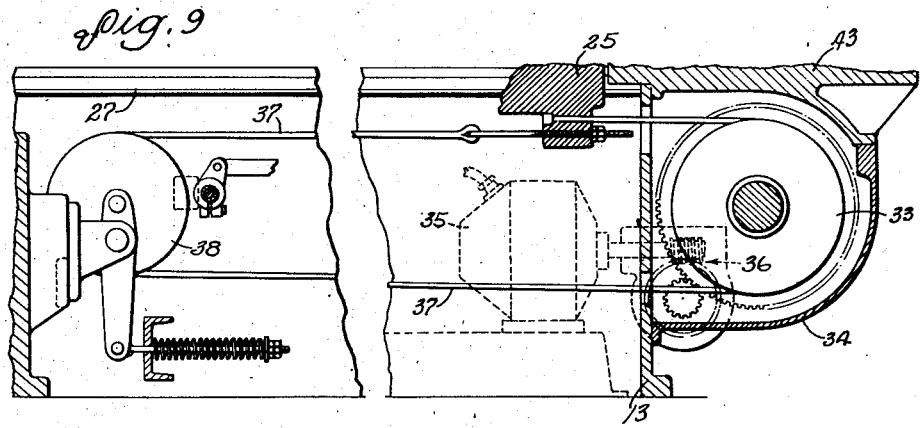
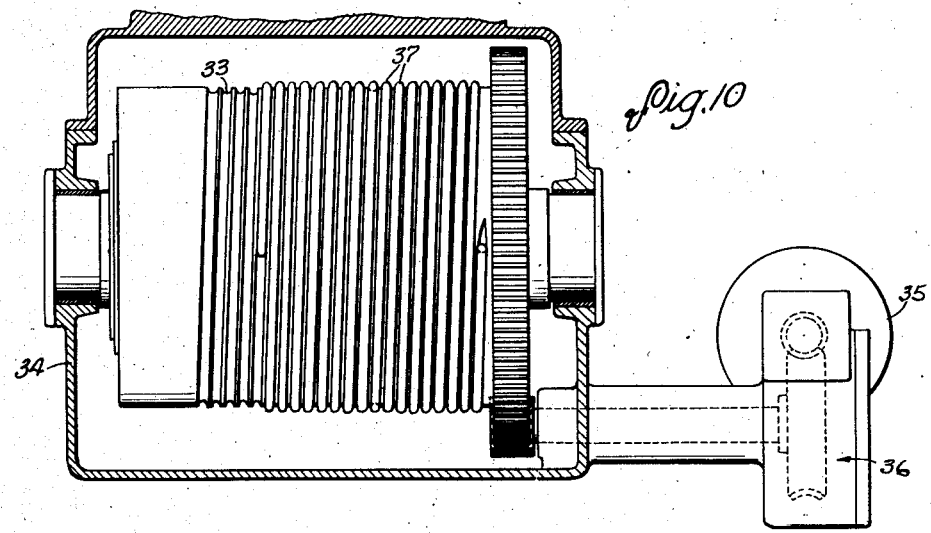
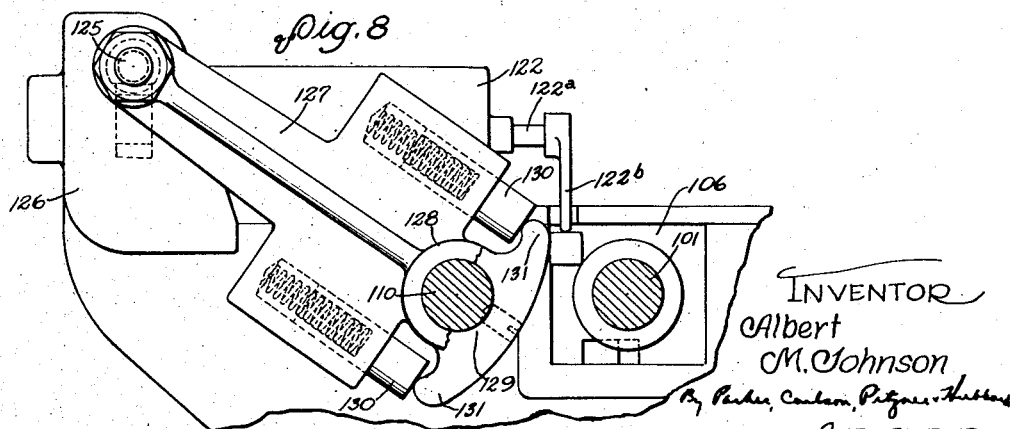
INVENTOR
Albert M. Johnson
ATTORNEYS Jan. 25, 1938.     A. M. JOHNSON     2,106,217
MACHINE TOOL
Filed Nov. 29, 1935     5 Sheets-Sheet 5
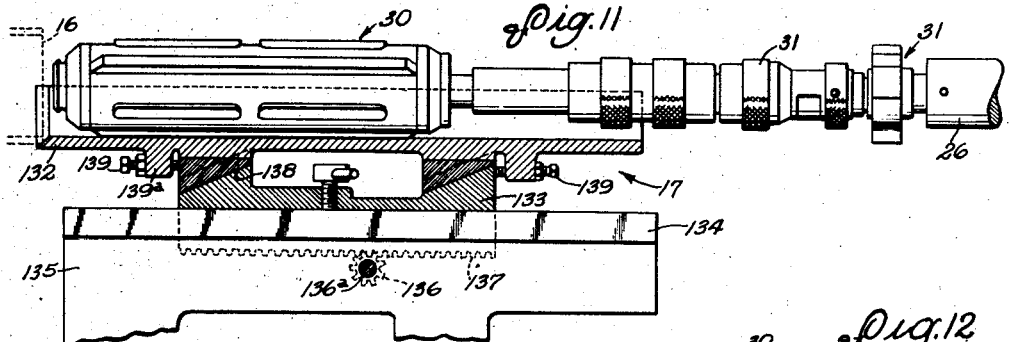
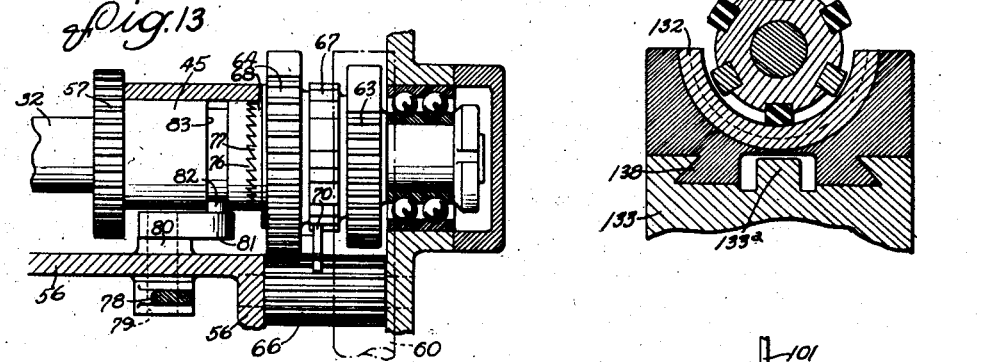
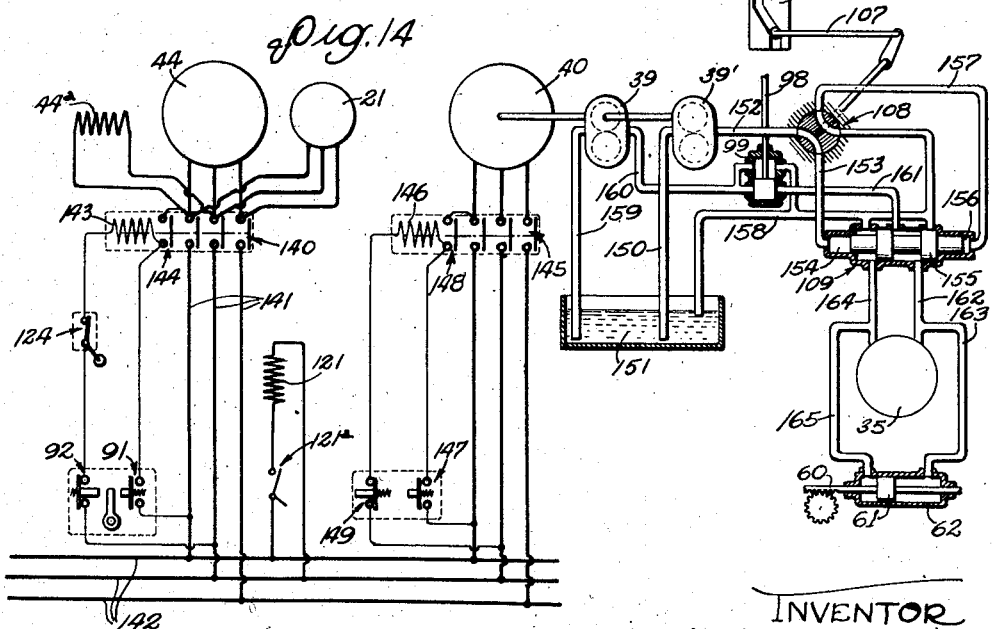
INVENTOR
Albert M. Johnson
By Parker, Carlson, Pitzner & Hubbard
ATTORNEYS Patented Jan. 25, 1938

2,106,217

UNITED STATES PATENT OFFICE 2,106,217

MACHINE TOOL

Albert M. Johnson, Rockford, Ill., assignor to Barnes Drill Co., Rockford, Ill., a corporation of Illinois Application November 29, 1935, Serial No. 52,105

33 Claims. (Cl. 51—34)

The invention relates to a machine tool for operating on the internal surfaces of hollow cylinders or tubes of substantial length, and more particularly to a machine tool for finishing such cylinders to exact dimensions and for producing a very smooth, true finish on the surface thereof.

The accurate finishing of the internal surface of hollow cylinders or tubes is most effectively accomplished by honing or lapping operations in which a fine, cylindrical abrasive tool, commonly termed a hone or lap, is repeatedly passed over the surface to be finished. As is characteristic of any abrasive finishing operation, the finished surface will be marked by minute grooves or striae hereinafter referred to by the latter term representing the cuts made by individual grains of the abrasive comprising the tool. The dimensions of the striae are dependent, of course, upon the size of the abrasive grains, and in any case are of microscopic proportions. In the honing operation, the tool is simultaneously reciprocated and rotated while operating on the work. Thus the striae representing the cuts of the individual grains of the abrasive are helical in form and those produced by one stroke of the tool are intersected at an angle by those produced by the alternate stroke of the tool resulting in a "crosshatch" effect which is highly advantageous for many types of work. In the longitudinal honing or straight line lapping without rotation, the tool is reciprocated and, during this reciprocation, is indexed intermittently, that is, by partial rotation or a small arc of spacing at one or both ends of the operating stroke in order to bring different surfaces of the tool and work into engagement in each operating stroke. The striae produced by the individual abrasive grains are thus substantially parallel to the longitudinal axis of the work.

The particular operation to be employed upon a given piece of work will depend upon the character of the work being operated upon and likewise upon the specific type of surface finish desired. In finishing certain classes of work, as for example recoil and recuperator cylinders such as are employed in gun carriages, an absolutely true and uniform surface such as is provided by the honing operation is essential. At the same time, it may be desirable that the striae formed by the individual abrasive grains be parallel to the longitudinal axis of the cylinder in order to reduce the wear on the relatively soft piston rings ordinarily employed. Accordingly, work of this character may be most conveniently finished by a combination of the two operations, the surface first being trued and finished approximately to size by a honing operation and then finally straight line lapped to produce the longitudinal striae. On account of the different operating requirements involved in honing and straight line lapping, respectively, it has heretofore been customary to provide separate machines for the two operations. It is an object of the present invention to provide a machine by which both the honing and straight line lapping operations may be performed efficiently and accurately, thus requiring only a single setting-up of the work with a resultant speeding up of the finishing operation and a definite reduction in the cost thereof.

Another object is to provide an improved tool reciprocating mechanism for a honing and lapping machine whereby the tools may be reciprocated at high speed with substantially no vibration and with a minimum of shock incident to the change in direction of tool movement.

Another object is to provide an improved tool rest for honing or lapping machines of the horizontal type which is readily adjustable to insure accurate positioning of the tool with respect to the work, and which provides convenient access to the tool, thus facilitating inspection and adjustment thereof.

Another object is to provide an improved honing and lapping machine adapted to operate on relatively long cylinders or tubes supported in horizontal position, and which is equipped with control mechanism of an advantageous character whereby the operation of the machine may be interrupted automatically after the tool has been reciprocated through a predetermined number of strokes.

Still another object is to provide a combined honing and straight line lapping machine having selectively operable means for imparting continuous rotary motion to the tool spindle or to impart an intermittent, step-by-step rotary movement thereto.

A further object is to provide an improved tool-spindle indexing mechanism particularly suitable for straight line lapping operations together with control means whereby the mechanism may be readily adapted to index the tool spindle at either or both ends of the reciprocatory stroke.

Other objects and advantages will become apparent from the following description taken in connection with the accompanying drawings, in which:

Figure 1 is an elevational view of a machine embodying the features of the invention.

Fig. 2 is a partial plan view of the machine shown in Fig. 1.

Fig. 3 is a vertical sectional view of the spindle driving mechanism taken on the line 3—3 of Fig. 2.

Fig. 4 is a transverse sectional view of the spindle indexing mechanism taken on the line 4—4 of Fig. 3.

Fig. 5 is a view, partly in section, of a part of the control mechanism.

Fig. 6 is a fragmentary plan view showing a part of the spindle stroke-counting mechanism and the automatic control mechanism.

Fig. 7 is a sectional view taken along the line 7—7 of Fig. 6, showing a part of the control rod actuating mechanism.

Fig. 8 is a sectional view taken along the line 8—8 of Fig. 6, showing the restoring mechanism associated with the control rod of the stroke-counting mechanism.

Fig. 9 is a longitudinal sectional view through the base of the machine showing the mechanism by which the tool spindle carriage is reciprocated.

Fig. 10 is a view, partly in section showing the cable drum and associated parts of the spindle carriage reciprocating mechanism.

Fig. 11 is a longitudinal sectional view of the tool rest with a honing tool shown in position thereon.

Fig. 12 is a transverse sectional view of a honing tool and the tool rest.

Fig. 13 is a detail view partly in section of a portion of the spindle driving mechanism as viewed from above.

Fig. 14 is a schematic representation of the various electrical and hydraulic circuits of the machine showing their relationship to the mechanical operating and control elements.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Generally stated, the machine as illustrated herein comprises an elongated supporting frame or base upon one end of which is mounted the work supporting fixtures and the tool rest. The work supporting fixtures are preferably adjustable so as to accommodate work pieces of different sizes and to facilitate the setting-up of the work in position to be operated on by the tool. The tool rest is also adjustable to insure accurate positioning of the tool when the same is being inserted in or withdrawn from the work. The other end of the base is provided with horizontally disposed tracks or ways for a reciprocating spindle head or carriage which operatively supports the tool spindle. At this end of the base are also located the various driving mechanisms and control devices. The driving mechanism includes hydraulically actuated means for reciprocating the spindle carriage and means for rotating and indexing the tool spindle, the latter being operatively connected with the tool spindle by a splined drive shaft.

More specifically stated, the machine herein disclosed comprises an elongated hollow frame or base consisting, in the present instance, of a main base section 13 and an extension or outboard base section 14 secured together at adjacent ends, as shown in Fig. 1. The base section 14 carries suitable work supporting fixtures 15 for supporting work such as a cylinder 16 to be operated on by the machine, and a tool rest generally designated 17 for supporting the tool when withdrawn from the work, and for guiding the tool into and out of operative relation with the work. The base section 14 also carries a coolant directing fixture 18 adjustable with respect to the work, by which coolant is directed into the interior of the work to prevent excessive heating of the same. Coolant may be conveniently supplied to the directing fixture 18 by a suitable pump 19 through a duct or tube 20 which is preferably of flexible construction to facilitate adjustment of the fixture. In the preferred embodiment, an electric motor 21 is provided for driving the pump 20. A convenient location for a coolant settling tank 22, a filter 23, and a sump or reservoir 24, is provided within the hollow base section 14.

Incorporated in the main base section 13 are tracks or ways for a reciprocating spindle-carriage 25 in which a tool supporting spindle 26 is journaled. The tracks or ways may conveniently comprise spaced parallel rails 27 (Figs. 2 and 9) carried on opposite sides of the base and extending longitudinally thereof. Any suitable means of supporting the carriage on the ways may be employed, a preferred means being the arrangement shown in my copending application Serial No. 3,714, filed January 28, 1935. Briefly, the preferred supporting means comprises suitably shaped roller members, indicated at 28, adapted to project downwardly from the spindle carriage to engage the rails 27 and thus hold the carriage firmly against lateral movement or vibration while offering a minimum of frictional resistance to carriage reciprocation.

The tool spindle 26 is suitably supported at one end by an elongated bearing 29 formed substantially centrally of the carriage 25. The free end of the spindle carries a honing or lapping tool 30 secured thereto by means of a flexible coupling shank 31 of any suitable construction. An operative connection between the spindle 26 and a splined drive shaft 32 by which rotary movement is imparted to the spindle is provided by a gear train including a driving gear 30$^a$ slidably mounted on the shaft 32 and splined thereto, and a driven gear 31$^a$ keyed to the end of the tool spindle 26.

Reciprocation of the spindle carriage may be effected by any suitable means as, for example, a hydraulically operated drum and cable mechanism as shown in Figs. 9 and 10. This mechanism comprises generally a grooved cable drum 33 journaled in a housing 34 mounted on one end of the base section 13. The drum 33 may be rotated either forwardly or backwardly by a reversible rotary hydraulic motor 35 which is operatively connected with the drum through a suitable enclosed gear train generally designated 36. An operative connection between the mechanism and the carriage 25 is provided by a flexible cable 37 running over the drum 33 and over sheave 38 yieldably supported at the other end of the frame. Opposite ends of the cable are connected to the underside of the carriage in any suitable and convenient manner. Thus, the rotation of the drum 33 in one direction moves the carriage 25 toward one end of the base, and rotation of the drum in the other direction, moves the carriage toward the other end of the base. This type of reciprocating mechanism is characterized by its smooth and shockless operation, which is highly advantageous in precision finishing operations such as honing and lapping for which the present machine is designed.

Pressure fluid for operating the hydraulic motor 35 is preferably supplied by a low-pressure fluid pump 39 adapted to be continuously driven by an electric motor 40. Control of the hydraulic motor is conveniently effected through the medium of a suitable valve mechanism generally designated 41, and certain manual and automatic control devices to be described hereinafter.

For rotating and indexing the tool spindle 26, spindle driving mechanism 42 (Figs. 1 and 2) is provided. The driving mechanism 42 is preferably mounted on the same end of the base section 13 as the cable drum 33, and the upper portion of the drum housing 34 may be conveniently formed to constitute a supporting base 43 for the driving means. By thus mounting the driving mechanism on the base rather than on the spindle carriage 25, the weight of the reciprocating parts is substantially reduced so that the spindle carriage may be reciprocated at relatively high speeds without excessive vibration or shock and without subjecting the various parts of the machine to undue wear or strain.

The tool spindle driving mechanism 42 comprises two separate drive means, one actuated by a motor 44 for imparting continuous rotation to the spindle, and one actuated hydraulically, in timed relation to spindle reciprocation, for imparting intermittent rotative movement to the spindle. The two driving means are selectively rendered operative through the medium of a connecting element 45 (Figs. 3 and 13) in continuous driving relation with the spindle but manually shiftable into operative relation to one or the other of the two drive means, the arrangement being such that only one drive means can be placed in operation at any time.

To drive the spindle continuously from the motor 44, I provide a gear train which, in the present instance, is designed to give a substantial reduction in speed between the motor shaft and the terminal gear of the train. Referring more particularly to Fig. 3 of the drawings, the gear train as shown herein comprises a driving gear 46, intermediate gears 47, 48 and 49 and a terminal gear 50. Gear 46 is fast on one end of a shaft 51, the other end of the shaft being drivingly connected with the motor shaft by a coupling member 52. The gears 47 and 48 are keyed to opposite ends of a shaft 53, gear 47 preferably being in the form of an internal spur gear and adapted to engage with the driving gear 46. Gear 48 meshes with the gear 49 which, with the terminal gear 50, is fast on a shaft 54. The shafts 51, 53 and 54 are journaled in bearings 55 carried on suitable supports formed on the interior walls of a sectional casing 56 enclosing the gear train. The terminal gear 50 is engageable by a spur gear 57 formed on one end of the connecting element 45 when the element is shifted to the left as viewed in Fig. 3. Thus a driving connection between the motor 44 and spindle 26 is completed through the gear train, connecting element 45 and drive shaft 32 whereby the spindle is rotated continuously by the motor.

The means for imparting step-by-step or indexing movement to the tool spindle 26 in timed relation to the reciprocation thereof comprises a plunger 60 (Figs. 4 and 14) actuated by a hydraulic piston 61 and cylinder 62 and adapted to be operatively associated with the connecting element 45. Referring to Fig. 14, it will be observed that the cylinder 62 is connected in the hydraulic circuit in parallel with the hydraulic motor 35 by which the spindle carriage is reciprocated. Thus the piston will be shifted in one direction when the motor is operated in one direction, and will be shifted in the opposite direction when the motor is reversed. The hydraulic mechanism is preferably so arranged and constructed that the shifting of the piston 61 is effected substantially immediately upon pressure fluid being supplied thereto—that is, the piston is shifted through its full stroke before the motor 35 becomes effective to start reciprocation of the spindle carriage.

The operative connection between the plunger 60 and the connecting element 45 is provided by a pawl and ratchet mechanism as shown in Figs. 3, 4 and 13. This mechanism includes a pair of gears 63 and 64 rotatively supported on the shaft 32 and adapted to be rotated in opposite directions incident to the movement of the plunger 60. To this end the plunger is provided with teeth 65 forming a downwardly facing rack engaging the gear 63 and an idler gear 66 which, in turn, drives the gear 64. It will be apparent that the movement of the plunger 60 will rotate gears 63 and 64 simultaneously but in opposite directions. More specifically, when the plunger is shifted to the right, as viewed in Fig. 4, gear 63 will be rotated in a clockwise direction while gear 64 rotates in the opposite direction. When the plunger is shifted to the left the direction of rotation of the gears will be reversed. Accordingly, one or the other of the gears will always be rotated in a clockwise direction in each stroke of the plunger 60.

Referring particularly to Fig. 3, it will be seen that the gears 63 and 64 are disposed on opposite sides of a ratchet wheel 67 formed on one end of a sleeve member 68. The sleeve 68 is rotatably mounted on the drive shaft 32, and gear 64, in turn, is rotatably supported on the sleeve with one face abutting against the shoulder formed by the ratchet wheel. Gear 63 is rotatably mounted on the shaft 32 with one face abutting against the ratchet end of the sleeve. Unidirectional rotative movement is imparted to the sleeve 68 by the gears 63 and 64 through the medium of pawls carried by the gears and engageable with the ratchet wheel 67. To this end a pawl 69 (Figs. 3 and 4) is pivotally mounted on the inner face of the gear 63 and disposed so as to operatively engage the teeth of the ratchet 67. A similar pawl 70 (Figs. 4 and 13) pivotally mounted on the inner face of the gear 64 also engages the teeth of the ratchet. The pawls are yieldably held in engagement with the ratchet teeth by means of suitable springs 71. As can be seen in Fig. 4, the teeth of the ratchet wheel are faced so that the pawls 69 and 70 are operative to rotate the same only when the associated gear is rotated in a clockwise direction. On rotation of a gear in the reverse direction, the pawl rides over the ratchet teeth without moving the sleeve 68. In the present instance the teeth are arranged in five generally similar groups and the stroke of the plunger 60 is so proportioned with respect thereto that each stroke of the plunger will turn the sleeve 68 through slightly more than one-fifth of a revolution for reasons to be pointed out hereinafter. Adjustment of the plunger stroke to obtain the desired amount of rotation of the sleeve may be conveniently effected through the medium of an adjusting screw 76 adapted to engage with the end of the plunger 60 and limit its movement in one direction.

The operative connection whereby the intermittent rotative movements of the sleeve 68 are transmitted to the drive shaft 32 and thus to the tool spindle 26 is provided by the connecting element 45, as hereinbefore indicated. To this end, the element 45, which is in the form of a sleeve splined to the drive shaft 32, is formed at one end with teeth 76 (Fig. 13) adapted to engage complementary teeth 77 formed on the adjacent end of the sleeve 68. In order to operatively engage these teeth, the connecting member 45 must be shifted to the right as viewed in Figs. 3 and 13 whereby the gear 57 is disengaged from the terminal gear 50 of the spindle rotating mechanism. Thus, only one of the spindle driving means can be connected in driving relation with the tool spindle 26 at any time and this connection is selectively effected by shifting the connecting member 45 to the left or right as required.

As shown herein, the connecting member 45 is shifted by means of a manually operable lever 78 (Figs. 1 and 13). The lever 78 is fast on one end of a transverse shaft 79 journaled in a suitable bearing 80 formed in the wall of the housing 56. Fast on the other end of the shaft 79 is an operating arm 81 having a projecting pin 82 adapted to ride in a peripheral groove 83 formed in the connecting member 45. Preferably, the lever 79 and operating arm 81 are set with respect to each other so that, when the lever is in a vertical position, the connecting member 45 will be held in an intermediate or neutral position in which both of the driving means will be disconnected from the drive shaft. By rocking the lever 78 to the left as viewed in Fig. 1, connecting member 45 is shifted to the left to engage the gear 57 with the terminal gear 50 of the spindle rotating means which accordingly, rotates the tool spindle continuously. When the lever 78 is rocked in the reverse direction, the spindle rotating means is disconnected and the teeth of the driving member 45 and indexing sleeve 68 are engaged to complete a driving connection whereby intermittent rotative movement is imparted to the tool spindle.

As a means of insuring the greatest possible smoothness and uniformity of the finished surface, the indexing means is arranged so as to effectually minimize any characteristic markings which the individual abrasive stones of the tool may leave upon the work. To this end, provision is made for indexing the abrasive tool non-uniformly that is, the tool is periodically indexed through a greater angle than usual so that the individual stones will follow a previously traversed path only after the tool has been reciprocated through a relatively large number of strokes. Thus repetition of the tool markings in any one place with a resultant enlargement thereof is avoided.

In the embodiment herein disclosed, non-uniform indexing is obtained by reason of the particular arrangement of the teeth of the ratchet wheel 67 and the coordination therewith of the stroke of the plunger 60. As shown in Fig. 4, the teeth of the ratchet wheel are arranged in five substantially equi-angular groups separated by teeth 72 which, measured circumferentially of the ratchet wheel, are relatively long. Four of the groups of teeth are similar and include two teeth 73 which are substantially shorter than the teeth 72. The fifth group comprises three teeth 74. These teeth occupy approximately the same spaces as two of the teeth 73 and are therefore substantially shorter than the latter teeth. As can also be seen in Fig. 4, the angular spacing of the pawls 69 and 70 at their extreme positions at the end of a stroke of the plunger 60 is slightly greater than the angle defined by any group of ratchet teeth. This spacing, of course, can be varied as desired by adjusting the length of the plunger stroke by means of the adjusting screw 76. To obtain non-uniform indexing, the pawls are preferably so spaced that when any one of the four similar groups of teeth are opposite the starting position of the pawl, the pawl will ride over the first short tooth and operatively engage the long tooth of the group as shown in Fig. 4. When the fifth or odd group of teeth are opposite the starting position, the pawl will drop over and engage the first short tooth 74 so that the ratchet wheel will be rotated through a substantially greater angle than in the previous steps. A similar advancement of the pawl over one tooth of the odd group takes place in each succeeding revolution of the ratchet wheel until the last tooth of the group is reached whereupon the complete cycle of operations is repeated. Thus, the ratchet wheel is advanced in non-uniform steps and, through the medium of the connecting element 45 and drive shaft 32, imparts a non-uniform step-by-step rotative indexing movement to the tool spindle 26.

In some instances it may be desirable to index the tool on alternate strokes rather than at the end of each stroke. To this end, means are provided for disabling one or the other of the indexing pawls selectively. As shown herein (Figs. 3 and 4) the pawl disabling means comprises a pair of cam plates 84 and 84ª in the form of elongated rectangular plates having suitable cam surfaces formed at one end. The cam plates are slidably supported in the housing 56 for horizontal movement whereby the cam surfaces may be moved into or out of the paths of the respective pawls 69 and 70. Thus, cam plate 84, when shifted to the right as viewed in Fig. 4, will have its cam surface interposed in the path of the pawl 69, tilting the pawl out of operative engagement with the ratchet wheel 67 so that no movement will be imparted to the sleeve 68 upon rotation of the gear 63. Cam plate 84ª controls the pawl 70 in the same manner to prevent an operative connection between gear 64 and the ratchet wheel 67. For convenient manipulation, the cam plates are formed to provide a suitable handle or grip 85. Means in the form of a yieldable detent 85ª is provided for maintaining each cam plate in either of its two set positions.

As above indicated, in both the honing and lapping operations the tool is reciprocated in the work by means of the hydraulically actuated drum and cable mechanism hereinbefore described. For controlling this reciprocating mechanism and also the tool spindle rotating and indexing mechanism, both automatic and manual control means are provided. As herein shown, the manual control means is of the same general character as that shown and described in detail in my copending application Serial No. 3,714. Referring to Figs. 1 and 2, it will be observed that a manual control lever 86 for starting and stopping the various driving mechanisms is located substantially centrally of the machine for convenient manipulation by the attendant. As shown in Fig. 5, the manual lever 86 is pivoted at 87 on a projecting flange 88 of a sleeve member 89 for movement through an arc in a plane transversely of the longitudinal axis of the machine. In this movement the lever serves to reciprocate a plunger 90 to actuate the spindle motor starting and stopping switches 91 and 92.

The sleeve 89 upon which the manual lever 86 is carried is rotatably supported on the base 13 in a suitable bearing 93 secured to the base. It will be apparent that the sleeve 89 may be rotated by rocking the manual lever 86 in a plane parallel to the axis of the base. This movement of the control lever is utilized to start and stop the reciprocation of the tool spindle through the medium of suitable link mechanism including a lever arm 94 fast on the inner end of the sleeve 89. A link 95 pivotally connected at one end to the arm provides an operative connection with one arm of a bell crank lever 96 (Fig. 6) pivotally supported on a bracket 97 mounted within the base 13 at a point opposite the valve mechanism 41 (Fig. 2). A transverse link 98 connects between the other arm of lever 96 and a control valve 99 (Fig. 14) by which the flow of pressure fluid to the hydraulic motor 35 and indexing cylinder 62 is controlled. Rocking the manual lever 86 to the left, as viewed in Fig. 1, serves to open the valve 99 whereby pressure fluid is supplied to the spindle reciprocating motor 35 and cylinder 62. Reverse movement of the control lever closes the valve 99 and thereby interrupts the reciprocation of the tool spindle.

For effecting the reversal of the spindle reciprocating motor 35 at the end of the spindle stroke, reversing mechanism of well known construction may be employed. As herein shown, this mechanism includes a slidably supported control rod 101 (Figs. 2, 5 and 6) carrying adjustable stops 102, 103 and 104. Stops 102 and 103 are preferably set to define the extreme limits of the spindle stroke and stop 104 may be set to define, with stop 102, the limits of the working stroke. The stops are positioned so as to be engaged by a projecting lug 105 on the spindle carriage 25 as the carriage approaches the respective limits in its travel. The control rod 101 is thus alternately shifted to the left or right and, through the medium of a cam block 106 (Figs. 6 and 14) and associated link 107, actuates a reversing valve 108 (Fig. 14) to control the supply of pressure fluid to the spindle reciprocating motor 35. This control is effected through the medium of a hydraulically actuated reversing valve 109 interposed in the hydraulic circuit between the pressure fluid pump 39 and the motor 35. The valve 109 is preferably supplied with pressure fluid by a high-pressure pump 39' driven in tandem with the low-pressure pump 39 by the motor 40. Thus the valve is rapidly shifted from open to closed position and vice versa upon the valve 108 being set to direct pressure fluid into one end or the other of the valve 109.

To insure the utmost uniformity and accuracy of the finished product, the machine comprising the present invention is provided with automatic control devices supplementing the manual control devices above described. Preferably the automatic devices include means for counting the number of times the tool is passed over the work—that is, the tool strokes,—and for automatically stopping the machine at the end of a predetermined number of strokes. To eliminate any possibility of the mouth of the work being marred or objectionably enlarged by the withdrawal of the flexibly mounted tool therefrom, the automatic control devices are arranged to bring the tool to rest within the work when the machine is automatically stopped. To this end there is provided an auxiliary control rod 110 (Figs. 2 and 6) adapted to cooperate with the spindle carriage and certain of the control devices to stop the machine independent of the main control rod 101.

Referring particularly to Figs. 1 and 2, it will be observed that the auxiliary control rod 110 is slidably supported parallel to the main control rod 101 adjacent the upper edge of the base. Control rod 110 is provided with a single adjustable stop 111 which, in its normal position, is tilted out of the path of the lug 105 as shown in Fig. 5. The stop 111 is provided with a downwardly extending arm 112, which, when the stop is rotated into a vertical position, lies in the path of a stud 113 projecting rearwardly from the flange of the sleeve 89. Thus the spindle carriage 25 through the medium of the lug 105 and stop 111 is enabled in its return movement to shift the control rod 110 to the right (as viewed in Fig. 2) and to rock the sleeve 89 in a clockwise direction. As hereinbefore explained, the rocking of sleeve 89 in this direction operates to stop the spindle carriage reciprocation mechanism through the medium of the link 95 and stop valve 99. Thus, the tool reciprocation may be automatically interrupted by rocking the control rod 110 through a small angle so as to rotate the stop 111 into operative position.

The mechanism for automatically rocking the control rod 110 to stop the reciprocation of the tool and for returning the control rod to normal position after this operation is shown in detail in Figs. 6, 7 and 8. Referring first to Fig. 6, it will be observed that the control rod 110 is provided with a tubular extension 114 journaled in spaced bearings 115 carried by a yoke 116 mounted on the base 13. A hollow cylindrical guide member 117 abutting against a stop 117ª is arranged to telescope into the tubular member 114 and a compression spring 118 enclosed within the members tends to force the control rod 110 to the left. A rod 119 anchored at one end to the control rod 110 and extending coaxially through the spring 118 is engageable by an adjusting screw 120 to limit the movement of the control rod in one direction. It will be apparent that when the control rod 110 is shifted to the right by the spindle carriage as above described, tubular member 114 will also shift to the right, thereby compressing the spring 118 and storing sufficient energy to return the control rod to normal position upon the stop 111 being disengaged from the spindle carriage, thus insuring a positive restoration of the control rod.

Engagement and disengagement of the stop 111 and the spindle carriage is effected by rotation of the control rod 110 about its axis. Automatic rotation of the control rod is provided in the present instance by a solenoid 121 (Figs. 6, 7 and 14) under control of a stroke counter 122 which is operatively associated with the spindle carriage reciprocation controlling mechanism. To this end, the core of the solenoid is operatively connected by means of a link 123 with a crank arm 123ª having a sleeve portion splined to the tubular shaft extension 114. Thus when the solenoid is energized, the extension 114 and control rod 110 are rocked in a counterclockwise direction as viewed in Fig. 7 or in a clockwise direction as viewed in Fig. 5 and stop 111 is interposed in the path of the spindle carriage lug 105.

The stroke counter 122 may be of the same general type as that disclosed in my prior Patent No. 1,945,045, granted January 30, 1934. For registering the strokes of the tool spindle, the counter is provided with a counting shaft 122ᵃ carrying an operating arm 122ᵇ adapted to be engaged by the cam plate 106 when the plate is shifted by the spindle carriage incident to its reciprocation. When the strokes registered by the counter reach a predetermined number as determined by the setting thereof, closure of a switch 121ᵃ (Fig. 14) completes an energizing circuit for the solenoid 121 with a resultant stoppage of the machine as hereinbefore explained.

The resetting of the stroke counter to normal or zero position and the stopping of the spindle drive and reciprocating motors is effected automatically by the shifting of control rod 110 to the left and right respectively. Thus, when the control rod is shifted to the right by reason of the stop 111 engaging the spindle carriage, valve 99 is actuated to interrupt the supply of pressure fluid to motor 35 and the reciprocation of the spindle carriage is stopped as hereinbefore explained. As the same time, a switch 124 (Figs. 6 and 14) is actuated to open the circuit of the spindle driving motor 44. The stroke counter 122 is reset to zero position by the actuation of a resetting shaft 124ᵃ incident to the shifting of control rod 110 back to its normal position under the influence of the spring 118.

The actuation of the switch 124 and the resetting of the stroke counter may be conveniently effected through the medium of a control bar 125 (Fig. 6) slidably supported on a bracket 126 carried by the frame 13 and operatively connected with the control rod 110 by means of a yoke member 127 (Fig. 8). The yoke member 127 is provided at one end with two spaced sleeves 128 through which the control rod 110 projects and the bar is rotatively anchored to the member by a collar 129 fast on the rod 110 and interposed between the two sleeves 128. The other end of the member 127 is secured to the control bar 125 so that axial shifting of the control rod 110 is effective to shift the control bar likewise.

Control rod 110 is free to rotate in the sleeves 128 within predetermined limits but is normally held with the stop 111 in the position shown in Fig. 5. To maintain the normal position of the control rod, the member 127 is provided with a pair of spring plungers 130 engaging arms 131 projecting from opposite sides of the collar 129 as shown in Fig. 8. Thus when the rod 110 is rocked in either direction, one of the plungers 130 is actuated to compress its associated spring and thereby store up sufficient energy to rock the rod back to normal position when the solenoid 121 is deenergized.

The various control devices are also provided with means permitting manual actuation when desired. Control rod 110, for example, is manually rotatable by means of the lever member 110ᵃ whereby the stop 111 may be moved into or out of the path of the lug 105 at will. In the case of the main control rod 106, a manual gripping member 106ᵃ provides means whereby the rod may be rocked to tilt the intermediate stop 104 out of the path of the lug 105 and thus permit the spindle carriage to move to its extreme position and retract the tool from the work. This control is ordinarily employed when setting up the work and for withdrawing the tool from the work onto the tool rest 17.

Reference has been made heretofore to the adjustable tool rest and guide 17 by which the tool 30 is supported when withdrawn from the work and guided into and out of operative relation to the work. In the preferred form as shown in Figs. 11 and 12, the tool rest 17 includes a generally semi-cylindrical cradle 132 adapted to receive the honing or lapping tool 30 when the tool is withdrawn. The semi-cylindrical construction of the cradle permits ready access to the tool for adjustment or inspection without necessitating its disconnection from the tool spindle.

The cradle 132 is carried by a base 133 slidably mounted on ways 134 formed along the upper edge of a supporting block 135 (Fig. 1) mounted on the base section 14. Movement of the base 133 to position the cradle 132 longitudinally with respect to the work 16 is effected by means of a pinion 136 engaging a rack 137 formed on the underside of the base 134, the pinion being fast on a shaft 136ᵃ manually operable in any convenient manner.

In precision finishing operations such as those performed by the machine herein illustrated, it is essential that the tool be withdrawn from or inserted in the work without tilting to avoid any chance of marring the work or enlarging the mouth thereof. To this end, means are provided for alining the cradle accurately with respect to the surface of the work. As shown herein, this means takes the form of inclined dovetailed slot connections 138 between the cradle 132 and the ends of the base 133 whereby the elevation of the cradle with respect to the work can be readily adjusted by a slight shifting of the cradle relative to the base. Adjustment is facilitated and maintained by adjusting screws 139 threaded into lugs 139ᵃ depending from the cradle and bearing against upstanding ribs 133ᵃ formed substantially centrally of the slots at each end of the base member 133. Thus, by loosening one screw and taking up the other screw an equal amount, cradle 132 may be raised or lowered to coincide exactly with the surface of the work and thereby insure the entry or removal of the tool without injury to the work.

The electrical and hydraulic circuits of the machine as herein disclosed are shown diagrammatically in Fig. 14. Referring to the drawings, it will be observed that the spindle driving motor 44 and coolant pump motor 21 are connected in multiple to one side of a three-pole switch 140. A branch 141 of a line 142 leading from any suitable source of electrical power terminates on the other side of the switch 140. Any suitable means may be employed for actuating the switch 140, a preferred means comprises a solenoid 143 arranged to close the switch when energized. Deenergization of the solenoid permits the switch to open by gravity or under the influence of a spring as desired.

For convenient starting and stopping of the motors, the push button switches 91 and 92, controlled by the manually operable lever 86 are provided. The closure of switch 91 completes an initial energizing circuit for the solenoid 143 which thereupon closes the switch 140 to start the motors 21 and 44. Solenoid 140 also closes a switch 144 to complete a maintaining circuit for itself independent of the switch 91 and the initial starting circuit. The maintaining circuit includes the normally closed switches 92 and 124 operable respectively by the manual control lever 86 and the automatic stroke counting mechanism. The opening of either of these switches deenergizes solenoid 143 thereby stopping the motors 21 and 44. As it is desirable to stop the motor 44 quickly whenever its circuit is opened, the motor may conveniently be provided with a shunt brake 44a of any suitable type.

Connection of the pressure fluid pump motor 40 with the power line 142 is effected by a switch 145 which, as herein shown, is closed by the energization of a solenoid 146. Initial energization of the solenoid may be effected by the closure of a push button switch 147 and the solenoid, on energizing, completes a maintaining circuit over a switch 148. Included in the maintaining circuit is a normally closed switch 149 which may be opened manually to stop the motor 40.

In the preferred form of the machine comprising the invention, pressure fluid for actuating the hydraulic valve 109 is supplied by the high-pressure pump 39' and pressure fluid for driving the rotary fluid motor 35 and for reciprocating the plunger 60 is supplied by the low-pressure pump 39. Both pumps are driven by electric motor 40. The pump 39' is provided with an intake duct 150 through which fluid is drawn from a reservoir or sump 151, and a discharge duct 152 terminating at one port of the valve 108. With the valve 108 in the position shown in the drawings, pressure fluid discharged through the duct 152 is delivered by way of a duct 153 to a cylinder 154 in the left end of the hydraulic valve 109. A plunger 155 constituting the valve mechanism is thus shifted to the position shown in the drawings, to control the delivery of pressure fluid to the motor 35. At the same time, spent fluid from a similar cylinder 156 in the right end of the hydraulic valve is discharged through a duct 157 and valve 108 and returned to the sump 151 through a spent fluid duct 158. It will be apparent that the reversal of the valve 108 incident to the shifting of the cam block 106 will reverse the hydraulic connections between the pump 39' and the valve 109. Accordingly, pressure fluid will be introduced into cylinder 156 and cylinder 154 will be connected to the spent fluid duct 158 with a resultant shifting of the valve plunger 155 to the left.

Low pressure pump 39, by which pressure fluid for operating the hydraulic motor 35 is supplied, draws fluid from the sump 151 through a duct 159 and discharges it through a pressure duct 160. Interposed in the duct system between the pump and the hydraulic valve 109 is the stop valve 99 by which the starting and stopping of the motor 35 is controlled manually or automatically as hereinbefore explained. With the valve 99 in the stop position as shown in the drawings, pressure duct 160 is connected with the spent fluid duct 158 and the pressure fluid delivered by the pump 39 is discharged into the sump 151. When the valve plunger 98 is shifted to running position, pressure fluid is supplied through a duct 161 and valve 109 to the hydraulic motor 35.

The position of the valve plunger 155 in the hydraulic valve 109 determines the direction of rotation of the motor 35. With the plunger in the position illustrated, pressure fluid delivered through duct 161 is introduced into the motor 35 through a duct 162 and the motor rotates its shaft in a clockwise direction. Simultaneously, the pressure fluid delivered through the duct 162 is supplied by way of a branch duct 163 to the right end of the indexing cylinder 62 and plunger 60 is shifted to the left. Spent pressure fluid from the motor 35 is discharged through a duct 164, valve 109 and the duct 158 to the sump 151.

Likewise spent pressure fluid from the cylinder 62 is discharged through a branch duct 165 connecting between the duct 164 and the left end of the cylinder 62.

Upon reversal of the hydraulic valve 109 incident to the reversal of the valve 108 as hereinbefore explained, the hydraulic circuits of the motor 35 and indexing cylinder 62 are reversed. Pressure fluid delivered through the duct 161 is thus supplied to the motor 35 through the duct 164 and the motor rotates its shaft in a counterclockwise direction. Likewise, pressure fluid is introduced into the left end of the indexing cylinder 62 and plunger 60 is thus shifted to the right as viewed in the drawings. Spent pressure fluid from the motor and indexing cylinder is returned to the sump 151 by way of the ducts 162, 163 and 158.

Having in mind the foregoing detailed description of the preferred embodiment, the operation of the combined honing and lapping machine comprising the invention will be readily understood. In operating the machine, the first step, of course, is to set up the work 16 on the work support. This is greatly facilitated by the provision of the adjustable work supports 15. The work may thus be quickly set up in exact axial alinement with the tool spindle with a minimum amount of labor.

After the work is set up, the tool 30 is adjusted to the required size while supported in the open cradle 132 of the tool rest. It is understood, of course, that at this time the tool spindle carriage will be in its extreme withdrawn position and that the various driving motors will be inactive.

Assuming that the work is to be given a honing operation first and then finished with a lapping operation, clutch control lever 78 will be rocked to the left to operatively connect the spindle rotating means with the drive shaft 32. The various stops 102, 103 and 104 will be set in their proper positions on the main control rod 101, so that stops 102 and 104 define the limits of the working stroke of the tool. Stop 111 will also be positioned on the auxiliary control rod 110, the position being slightly in advance of the stop 104 so that it will be effective to stop the machine substantially simultaneously with the engagement of stop 104 by the lug 105 in the final stroke of the tool. Finally, the stroke counter 122 will be set to determine the number of strokes to be given the work.

With the machine set as above described, the various motors may be started. Closure of the push button switch 147 starts the pressure fluid pump motor 40 and closure of the switch 91 starts the spindle drive motor 44 and coolant pump motor 41. The latter switch is actuated by rocking the manual control lever 86 toward the machine and the simultaneous rocking of this lever to the left as viewed in Fig. 1 shifts the stop valve 99 to open or running position. Fluid motor 35 thereupon operates to move the spindle carriage 25 toward the work and the tool 30, which is now rotated by the motor 44, enters the work. The spindle carriage lug 105 engages stop 104 as the tool enters the work but is ineffective at this time by reason of the yieldable construction of the stop.

As the tool approaches the end of the work, the spindle carriage lug 105 engages the stop 102, shifting control rod 101 and its associated cam plate 106 to the left, thereby reversing the valve 108. Valve 108 reverses the pressure fluid connections to hydraulic valve 109 and the latter valve is accordingly shifted to reverse position.

The direction of rotation of the fluid motor 35 is thus reversed and the spindle carriage is moved toward the driving end of the machine. As the tool again approaches the end of the work, stop 104 is engaged and shifts the control rod 101 to the right, thereby returning the valve 108 to its original position. Hydraulic valve 109 reverses the pressure fluid connections to the motor 35 which, accordingly, reverses the direction of spindle carriage travel.

The foregoing operating cycle is repeated until the work has received the number of strokes indicated by the setting of the stroke counter 122. As the tool approaches the end of the work in its final stroke, the counter 122 closes the circuit of the solenoid 121 which operates to rotate stop 111 into the path of the spindle carriage lug 105 and the stud 113 of the control sleeve 89. Thus, control rod 110 is shifted to the right, opening the switch 126 to stop the spindle drive motor 56 and, by the actuation of the sleeve 89, stop valve 99 is shifted to closed position to stop the spindle carriage reciprocating motor 35. The tool is thus brought to rest within the work and at the entering end thereof.

The machine may now be set for the lapping operation by rocking the lever 78 so as to engage the indexing mechanism with the spindle drive shaft. The honing tool is withdrawn from the work and onto the tool rest and replaced by a lapping tool of any suitable type. It will be obvious that at the end of the honing operation, the interior diameter of the work will be somewhat greater than the original diameter. Accordingly, before the lapping tool is entered into the work, the cradle 132 may be lowered to bring it into exact alinement with the new surface of the work so that the tool may be inserted without the slightest tilting. Withdrawal of the tool at the completion of the operation is controlled manually through the manipulation of the stop bars 101 and 110 thus insuring careful removal of the tool.

The final straight line lapping operation in any case may be carried out without necessitating any change in the set-up of the work. To set the machine for the lapping operation, the control lever 78 is rocked to the right thereby disengaging the spindle rotating means from the drive shaft 32 and operatively associating the indexing mechanism therewith. The various motors (except the spindle rotating motor 44 which is not operated in the lapping operation) are started in exactly the same manner as for the honing operation and the stroke counter may likewise be set to determine the number of operating strokes. The tool is accordingly reciprocated in the work and, at the end of each stroke is indexed so as to bring different areas of the tool and work into engagement. If it is desired to index the tool only on each alternate stroke, one or the other of the cam plates 84 or 84ᵃ is shifted inwardly to disable the associated pawl mechanism by which the indexing movement is imparted to the drive shaft 32. Thus when cam plate 84 is actuated pawl 69 is disengaged from the ratchet wheel 67 and the shaft 32 is indexed only at the termination of the inward stroke of the tool. The actuation of cam plate 84ᵃ disables pawl 70 so that indexing takes place only at the termination of the outward stroke of the tool.

At the end of the lapping operation, the machine may be stopped by the stroke counting mechanism which operates in the manner hereinbefore explained in connection with the honing operation. Likewise the withdrawal of the tool from the work is the same as heretofore described.

It will be apparent from the foregoing that I have provided an improved machine by which the internal surfaces of hollow tubes or cylinders of substantial length may be finished to exact dimensions and with an exceedingly smooth true surface. The work may be honed initially to remove a substantial amount of metal from the surface and to produce a smooth, true surface and then lapped to produce a longitudinally striated surface with a single setting up operation. Moreover, the machine may be conditioned for either operation by simply actuating a manually operable lever, no replacement or interchange of parts being required. The machine is stopped automatically when the work has been given the required number of strokes, the tool being brought to rest at the mouth of the work so that it can readily be withdrawn without marring the same. Further, certain of the mechanisms and devices which in their combined form constitute the improved honing and lapping machine include novel and advantageous structural features which contribute to the increased efficiency and reliability of the machine. Among these are an improved tool rest by which the tool is accurately guided into and out of the work and supported so as to be completely accessible for inspection or adjustment when withdrawn from the work. I have also provided an indexing mechanism of advantageous character whereby the tool may be indexed at either or both ends of the stroke as required and in timed relation thereto.

I claim as my invention:

1. A combined honing and lapping machine having a work support and a tool support, means for reciprocating one of said supports, and means operable selectively to impart either a continuous rotary motion to the tool support or a step-by-step rotative movement thereto.

2. A combined honing and lapping machine having a work support and a tool support, means for reciprocating one of said supports, means for rotating said tool support continuously, means for rotating said tool support in intermittent non-uniform steps, and means selectively operable to render either of said means effective.

3. A machine for honing or lapping internal cylindrical surfaces comprising, in combination, an elongated frame, a carriage supported on the frame for movement longitudinally thereof, a tool spindle journaled in the carriage and movable therewith, an abrasive tool carried by the spindle, means for supporting work to be operated on by the tool, means for reciprocating the carriage and tool spindle, a first driving means for rotating the tool spindle continuously during its reciprocation, a second driving means for rotating the tool spindle intermittently in timed relation to its reciprocation, and means for operatively associating either drive means with the tool spindle to the exclusion of the other drive means.

4. A machine for honing or lapping internal cylindrical surfaces comprising, in combination, an elongated frame, a carriage supported on the frame for movement longitudinally thereof, a tool spindle journaled in the carriage and movable therewith, an abrasive tool carried by the spindle, means for supporting work to be operated on by the tool, means for reciprocating the carriage and tool spindle, driving means for rotating the tool spindle continuously during its reciprocation, other driving means for rotating the tool spindle intermittently in timed relation to its reciprocation, and means for operatively connecting either drive means with the tool spindle, said last means comprising single connecting element drivingly connected with the tool spindle and shiftable into operative relation with either driving means.

5. A machine for honing or lapping internal cylindrical surfaces comprising, in combination, an elongated frame, a carriage supported on the frame for movement longitudinally thereof, a tool spindle journaled in the carriage and movable therewith, an abrasive tool carried by the spindle, means for supporting work to be operated on by the tool, means for reciprocating the carriage and tool spindle, a first driving means including an electric motor for rotating the tool spindle continuously during its reciprocation, a second driving means including a hydraulic motor for rotating the tool spindle intermittently in timed relation to its reciprocation and means for selectively connecting either drive means with the tool spindle.

6. A machine for honing or lapping internal cylindrical surfaces comprising, in combination, an elongated frame, a carriage supported on the frame for movement longitudinally thereof, a tool spindle journaled in the carriage and movable therewith, an abrasive tool carried by the spindle, means for supporting work to be operated on by the tool, means for reciprocating the carriage and tool spindle, a splined shaft journaled in the frame substantially parallel to the reciprocating path of the carriage, a train of gears on the carriage operatively connecting the splined shaft with the tool spindle, one of said gears being mounted on the shaft in slidable non-rotative relation thereto and another of said gears being fast on the tool spindle, and driving means mounted on the frame and adapted to be selectively connected to said shaft to rotate the same continuously during the reciprocation of the carriage or to rotate the shaft intermittently in timed relation to the reciprocation of the carriage.

7. A machine for honing or lapping internal cylindrical surfaces comprising, in combination, an elongated frame, a carriage supported on the frame for movement longitudinally thereof, a tool spindle journaled in the carriage and movable therewith, an abrasive tool carried by the spindle, means for supporting work to be operated on by the tool, means for reciprocating the carriage and tool spindle, a splined shaft journaled in the frame substantially parallel to the reciprocating path of the carriage, a train of gears on the carriage operatively connecting the splined shaft with the tool spindle, one of said gears being mounted on the shaft in slidable non-rotative relation thereto and another of said gears being fast on the tool spindle, and driving means mounted on the frame and adapted to be selectively connected to said shaft to rotate the same continuously during the reciprocation of the carriage or to rotate the shaft intermittently in timed relation to the reciprocation of the carriage, said driving means including an electric motor and an associated train of gears for connecting the same with the shaft and a hydraulic motor and an associated pawl and ratchet mechanism for connecting the hydraulic motor with the shaft.

8. Mechanism for intermittently rotating the reciprocatory tool spindle of a machine tool in timed relation to its reciprocation comprising, in combination, a hydraulic cylinder, a piston reciprocable in the cylinder, means for supplying pressure fluid to opposite ends of the cylinder alternately to reciprocate the piston, a plunger carried by said piston, and one-way connecting devices for operatively connecting the plunger and the tool spindle whereby unidirectional rotative motion is imparted to the tool spindle on each stroke of the piston, one of said devices providing a driving connection between the plunger and the tool spindle on the outward stroke of the piston and the other of said devices providing a driving connection between the plunger and the tool spindle on the inward stroke of the piston.

9. Mechanism for intermittently rotating the reciprocatory tool spindle of a machine tool in timed relation to its reciprocation comprising, in combination, a hydraulic cylinder, a piston reciprocable in the cylinder, means for supplying pressure fluid to opposite ends of the cylinder alternately to reciprocate the piston, a plunger carried by said piston, and one-way connecting devices for operatively connecting the plunger and the tool spindle whereby unidirectional rotative motion is imparted to the tool spindle on each stroke of the piston, one of said devices providing a driving connection between the plunger and the tool spindle on the outward stroke of the piston and the other of said devices providing a driving connection between the plunger and the tool spindle on the inward stroke of the piston, and means selectively operable to render either of said devices ineffective.

10. Mechanism for intermittently rotating the reciprocatory tool spindle of a machine tool in timed relation to its reciprocation comprising, in combination, a hydraulic cylinder, a piston in the cylinder, means for supplying pressure fluid to the cylinder to reciprocate the piston, and means providing a driving connection whereby unidirectional rotary motion is imparted to the tool spindle on each stroke of the piston, said means including a pair of pawl and ratchet devices effective respectively on alternate strokes of the piston to complete the driving connection.

11. Mechanism for intermittently rotating the reciprocatory tool spindle of a machine tool in timed relation to its reciprocation comprising, in combination, a hydraulic cylinder, a piston in the cylinder, means for supplying pressure fluid to the cylinder to reciprocate the piston, and means providing a driving connection whereby unidirectional rotary motion is imparted to the tool spindle on each stroke of the piston, said means including a drive shaft drivingly connected with the tool spindle, a pair of gears rotatively supported on the drive shaft, a ratchet wheel supported on the drive shaft and adapted to be non-rotatively secured thereto, a pawl carried by each of said gears and adapted to engage said ratchet wheel to impart unidirectional rotation thereto, and a driving connection between the piston and said gears whereby the gears are simultaneously rotated in opposite directions on each stroke of the piston.

12. Mechanism for indexing the reciprocatory tool spindle of a machine tool in timed relation to its reciprocation comprising, in combination, means operative to impart rotative movement to the spindle at one end of its stroke, means operative to impart rotative movement to the spindle at the other end of its stroke, and manually operable means for selectively disabling either of said means.

13. Mechanism for indexing the reciprocating tool spindle of a machine tool in timed relation to its reciprocation comprising, in combination, a ratchet wheel and means operatively connecting it with the tool spindle, driving means including a pawl engageable with said ratchet wheel to impart rotative movement to the tool spindle at one end of its stroke, other driving means including a second pawl engageable with said ratchet wheel to impart rotative movement to the tool spindle at the other end of its stroke, and selectively operable means for shifting either of said pawls out of engagement with said ratchet wheel to prevent rotation of the tool spindle at one end of its stroke.

14. Mechanism for indexing the reciprocatory tool spindle of a machine tool in timed relation to its reciprocation comprising, in combination, a ratchet wheel and means operatively connecting it with the tool spindle, a pawl adapted to engage said ratchet wheel to impart a rotative movement to the tool spindle at one end of its stroke, a second pawl adapted to engage said ratchet wheel to impart rotative movement to the tool spindle at the other end of its stroke, and means for actuating said pawls.

15. A honing and lapping machine having, in combination, a reciprocatory carriage, a tool spindle journaled in said carriage, means for reciprocating the carriage and tool spindle, and means for imparting non-uniform rotative steps to the tool spindle in timed relation to its reciprocation.

16. Control mechanism for a honing and lapping machine having a reciprocable tool spindle carriage, said mechanism comprising, in combination, a main control rod adapted to cooperate with the carriage to control the reciprocation thereof, an auxiliary control rod adapted to cooperate with the carriage to interrupt the reciprocation thereof, and a counting mechanism actuated by said main control rod to count the reciprocations of the carriage and operative at the end of a predetermined number of carriage reciprocations to initiate the operation of said auxiliary control rod.

17. Control mechanism for a honing and lapping machine having a reciprocable tool spindle carriage, said mechanism comprising, in combination, a main control rod having spaced stops adapted to cooperate with the carriage to define the limits of carriage travel, an auxiliary control rod having a stop adapted to cooperate with the carriage to interrupt the reciprocation thereof, and a counting mechanism actuated by said main control rod to count the reciprocations of the carriage and operative at the end of a predetermined number of carriage reciprocations to bring the stop of said auxiliary control rod into cooperative relation with the carriage.

18. Control mechanism for a honing and lapping machine having a reciprocable tool spindle carriage, said mechanism comprising, in combination, a main control rod having spaced stops adapted respectively to be engaged by the carriage at opposite ends of the stroke thereof to define the limits of carriage travel, an auxiliary control rod having a stop adapted to be engaged by the carriage in one stroke thereof immediately prior to the engagement of the stop of the main control rod and thereby interrupt the reciprocation of the carriage before the main control rod is actuated, and a counting mechanism adapted to count the reciprocations of the carriage and operative at the end of a predetermined number of carriage strokes to shift the stop of said auxiliary control rod into position for engagement by said carriage.

19. Control mechanism for a honing and lapping machine having a reciprocable tool spindle carriage, said mechanism comprising, in combination, a main control rod adapted to be shifted alternately in opposite directions by the carriage to control the reciprocation thereof, an auxiliary control rod adapted to be shifted in one direction by the carriage to interrupt the reciprocation thereof, a counting mechanism actuated by said main control rod to register the number of carriage reciprocations and operative incident to the registration of a particular number of reciprocations to initiate the shifting of said auxiliary control rod, means for shifting said auxiliary control rod back to normal position independent of the carriage, and means actuated by said auxiliary control rod in its return to normal position to efface the registration of said counting mechanism.

20. A machine for honing and lapping an internal cylindrical surface in a single setting of the work comprising, in combination, a cylindrical abrasive tool, means for reciprocating and continuously rotating the tool in the work to hone the same, means for reciprocating and intermittently rotating the tool in the work to lap the same, and means for automatically stopping the tool within the work at the end of each operation, said means including mechanism for counting the strokes of the tool and for interrupting the reciprocation and rotation of the tool at the end of a predetermined number of strokes.

21. A machine for honing and lapping an internal cylindrical surface in a single setting of the machine comprising, in combination, a cylindrical abrasive tool, means for reciprocating and continuously rotating said tool in the work, means for reciprocating and intermittently rotating the tool within the work, means selectively operable to render either of said means operative, mechanism for counting the number of tool strokes in either of said operations, and means controlled by said mechanism for interrupting the reciprocation and rotation of the tool to bring the same to rest within the work at the end of one operation whereby the other operation may be initiated without resetting the machine.

22. A machine for honing or lapping internal cylindrical surfaces comprising, in combination, a horizontally disposed elongated frame, a carriage supported on the frame for movement longitudinally thereof, a tool spindle journaled in the carriage and movable therewith, an abrasive tool carried by the spindle, means for supporting work to be operated on by the tool, means for reciprocating the tool within the work, means for counting the number of strokes of the tool, and means controlled by said counting means for interrupting said reciprocation at the end of a predetermined number of strokes, said interrupting means being arranged to stop the tool at the point at which it first operatively engaged the work.

23. A machine for honing or lapping internal cylindrical surfaces comprising, in combination, a horizontally disposed elongated frame, a carriage supported on the frame for movement longitudinally thereof, a tool spindle journaled in the carriage and movable therewith, an abrasive tool carried by the spindle, means for supporting work to be operated on by the tool, means for reciprocating the tool within the work, a manual operator for initiating and interrupting said reciprocation, means for counting the number of strokes of the tool, and means operated by said counting means at the end of a predetermined number of strokes of the tool for automatically actuating said manual operator to interrupt the reciprocation thereof.

24. A machine for honing or lapping internal cylindrical surfaces comprising, in combination, a horizontally disposed elongated frame, a carriage supported on the frame for movement longitudinally thereof, a tool spindle journaled in the carriage and movable therewith, an abrasive tool carried by the spindle, means for supporting work to be operated on by the tool, means for reciprocating the tool within the work, a manual operator for initiating and interrupting said reciprocation, means for counting the number of strokes of the tool, means operated by said counting means at the end of a predetermined number of strokes of the tool for automatically actuating said manual operator to interrupt the reciprocation thereof, and means for automatically restoring said counting means and said automatic actuating means to normal condition.

25. A mechanism for honing or lapping internal cylindrical surfaces comprising, in combination, a horizontally disposed elongated frame, a carriage supported on the frame for movement longitudinally thereof, a tool spindle journaled in the carriage and movable therewith, an abrasive tool carried by the spindle, means for supporting work to be operated on by the tool, means for rotating and reciprocating the tool within the work, means for counting the number of strokes of the tool, and means controlled by said counting means for simultaneously interrupting said reciprocation and said rotation at the end of a predetermined number of strokes, said interrupting means being arranged to stop the tool at the point at which it first operatively engaged the work.

26. In a honing machine, the combination of a reciprocating carriage, a rotatable spindle journaled in the carriage and reciprocable therewith, an abrasive tool carried by the spindle, means for supporting work to be operated on by the tool, and means for guiding the tool into and out of the work including a cradle having an upwardly opening semi-cylindrical channel adapted to receive the tool, a base for supporting the cradle, and means for adjusting the position of said cradle relative to the work by effecting a relative movement between the cradle and said base.

27. In a machine for finishing internal cylindrical surfaces, the combination of a reciprocating carriage, a rotatable spindle journaled in the carriage and reciprocable therewith, an abrasive tool yieldably carried by the spindle, means for supporting work to be operated on by the tool, and means for guiding the tool into and out of the work including an upwardly opening cradle adapted to receive the tool, a base for supporting the cradle, and means for adjusting the position of the cradle to aline the tool with the surface of the work to be operated on, said adjusting means including inclined coacting surfaces on said cradle and said base, respectively.

28. In a honing machine, the combination of a reciprocating carriage, a rotatable spindle journaled in the carriage and reciprocable therewith, an abrasive tool carried by the spindle, means for supporting work to be operated on by the tool, and means for guiding the tool into and out of the work including a cradle having an upwardly opening semi-cylindrical channel adapted to receive the tool, a base for supporting the cradle, and means for adjusting the position of said cradle relative to the work by effecting a relative movement between the cradle and said base, said adjusting means including an inclined dovetail slot connection between the cradle and the base.

29. In a honing machine, the combination of a reciprocating carriage, a rotatable spindle journaled in the carriage and reciprocable therewith, an abrasive tool carried by the spindle, means for supporting work to be operated on by the tool, and means for guiding the tool into and out of the work including a cradle having an upwardly opening semi-cylindrical channel adapted to receive the tool, a base for supporting the cradle, means for adjusting the position of the cradle axially of the work by simultaneously shifting the cradle and the base, and means for adjusting the position of the axis of the cradle transversely of the axis of the work by shifting the cradle relative to the base.

30. A machine for finishing the internal surfaces of hollow cylinders comprising, in combination, a reciprocable carriage, a spindle supported at one end of said carriage and carrying an abrasive tool at the other end, means for supporting a cylinder in position to be operated on by the tool, means for imparting substantially shockless reciprocation to said carriage to reciprocate the tool within the work, said reciprocating means including a rotary hydraulic motor, a grooved drum alternately rotated in opposite directions by said motor, a sheave yieldably supported in spaced relation to said drum, and a cable passing over said drum and said sheave and anchored at both ends to said carriage, and means operating in timed relation to the rotation of said drum for imparting a quick step-by-step rotative movement to the tool spindle at the end of a stroke to bring different surfaces of the tool and cylinder into engagement in the next stroke of the tool.

31. A machine for finishing the internal surfaces of hollow cylinders, comprising, in combination, an elongated base, a spindle carriage mounted for reciprocation at one end of the base, a spindle supported at one end on said carriage and carrying an abrasive tool at the other end, means on the base for supporting a cylinder in position to be operated on by the tool, means for reciprocating the spindle carriage to reciprocate the tool within the work, said reciprocating means comprising a rotary hydraulic motor, a drum journaled in a housing at one end of the base and alternately rotated in opposite directions by said motor, a sheave yieldably supported on said base in spaced relation to said drum, and a cable passing over said drum and said sheave and anchored at both ends to said carriage, and means mounted on said housing and operating in timed relation to the rotation of said hydraulic motor for imparting rotative movement to the tool substantially at the end of its stroke.

32. In a machine for dressing the internal surfaces of hollow cylinders, in combination, a work support for supporting a cylinder, a tool support carrying a cylindrical abrasive tool for operating upon the cylinder on said work support, hydraulically operated means for reciprocating said tool support longitudinally relative to said cylinder to cause the tool to traverse the cylinder in a substantially straight line, and hydraulically operated means operating in timed relation to said first mentioned means for imparting a rotative movement to said tool at the end of one stroke to bring different surface areas of the tool and cylinder into position for engagement in the succeeding stroke.

33. In a machine for dressing cylindrical surfaces, in combination, a support for work to be dressed, an abrasive tool for dressing the work, a support for said tool, means for reciprocating one of said supports relative to the other to cause the tool to operate upon the work, and means operable selectively to impart either a continuous rotary motion or a step-by-step rotative movement to one of said supports.

ALBERT M. JOHNSON.